US008355596B2

(12) United States Patent
Kimata et al.

(10) Patent No.: US 8,355,596 B2
(45) Date of Patent: Jan. 15, 2013

(54) IMAGE GENERATION METHOD AND APPARATUS, PROGRAM THEREFOR, AND STORAGE MEDIUM WHICH STORES THE PROGRAM

(75) Inventors: Hideaki Kimata, Yokosuka (JP); Shinya Shimizu, Yokosuka (JP); Kazuto Kamikura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 415 days.

(21) Appl. No.: 12/682,027

(22) PCT Filed: Oct. 9, 2008

(86) PCT No.: PCT/JP2008/068375

§ 371 (c)(1), (2), (4) Date: May 7, 2010

(87) PCT Pub. No.: WO2009/051062

PCT Pub. Date: Apr. 23, 2009

(65) Prior Publication Data

US 2010/0290715 A1 Nov. 18, 2010

(30) Foreign Application Priority Data

Oct. 15, 2007 (JP) ............................. P 2007-267613

(51) Int. Cl.
*G06K 9/40* (2006.01)

(52) U.S. Cl. ........ 382/274; 382/275; 382/299; 382/300; 358/3.26; 358/3.27; 358/525

(58) Field of Classification Search .................. 382/274, 382/275, 282, 299, 300; 358/274, 275, 525
See application file for complete search history.

(56) References Cited

U.S. PATENT DOCUMENTS 5,650,814 A 7/1997 Florent et al.

(Continued)

FOREIGN PATENT DOCUMENTS

EP 908847 A2 9/1999

(Continued)

OTHER PUBLICATIONS

Keita Takahashi and Takeshi Naemura, "Layered Light-Field Rendering with Focus Measurement", EURASIP Signal Processing: Image Communication, vol. 21, No. 6, pp. 519-530 (Jul. 2006) (in English).

(Continued)

*Primary Examiner* — Yosef Kassa

(74) *Attorney, Agent, or Firm* — Harness, Dickey & Pierce, P.L.C.

(57) ABSTRACT

An image generation method for generating image information of an image C by using an image A and an image B having a bit depth higher than that of image A. Image C having the same bit depth as image B is generated by increasing the bit depth of image A by means of tone mapping; presence or absence of a point in image B corresponding to each pixel position of image C and the position of the relevant corresponding point are estimated; and to each pixel position in image C for which it is estimated that there is a corresponding point, image information of the corresponding position in image B is assigned. It is possible to generate image information at each pixel position in image C for which it is estimated in the corresponding point estimation that there is no corresponding point, by using the image information assigned according to an estimation result that there is a corresponding point.

22 Claims, 10 Drawing Sheets

U.S. PATENT DOCUMENTS

| | | | | |
|---|---|---|---|---|
| 6,424,752 | B1 | 7/2002 | Katayama et al. | |
| 6,847,392 | B1 | 1/2005 | House | |
| 7,224,733 | B1 * | 5/2007 | Benzler et al. | 375/240.17 |
| 7,474,355 | B2 * | 1/2009 | Leone et al. | 348/453 |
| 7,545,269 | B2 * | 6/2009 | Craig et al. | 340/539.26 |
| 7,633,616 | B2 * | 12/2009 | Hing | 356/326 |
| 7,689,262 | B2 * | 3/2010 | Kruger et al. | 600/410 |

FOREIGN PATENT DOCUMENTS

| | | | |
|---|---|---|---|
| JP | 09-218954 | A | 8/1997 |
| JP | 11-102430 | A | 4/1999 |
| JP | 11-112790 | A | 4/1999 |
| JP | 11-242737 | A | 9/1999 |
| JP | 2001-067473 | A | 3/2001 |
| RU | 2 267 232 | C1 | 12/2005 |
| WO | 2004/057531 | A1 | 7/2004 |

OTHER PUBLICATIONS

M. Droese, T. Fujii, and M. Tanimoto, “Ray-Space Interpolation Constraining Smooth Disparities Based on Loopy Belief Propagation”, Proc. of IWSSIP2004, pp. 247-250, Poznan, Poland, Sep. 2004 (in English).

Takashi Matsuyama, Takeshi Takai, Xiaojunn Wu, and Shohei Nobuhara, “Generation, Editing, and Visualization of 3D Video”, Proceedings of The Virtual Reality Society of Japan, vol. 7, No .4, pp. 521-532, Dec. 2002 (in Japanese).

E. Reinhard, M. Stark, P. Shirley, and J. Ferwerda, “Photographic Tone Reproduction for Digital Images”, presented at SIGGRAPH, 2002 (in English).

* cited by examiner

A
B
301
IMAGE BIT-DEPTH INCREASING UNIT
D
302
CORRESPONDING POINT ESTIMATOR
303
CORRESPONDING IMAGE ASSIGNING UNIT
E
304
IMAGE INTERPOLATOR
E
305
IMAGE BIT-DEPTH DECREASING UNIT
F
306
DIFFERENCE GENERATOR
308
IMAGE GENERATOR
C

IMAGE GENERATION METHOD AND APPARATUS, PROGRAM THEREFOR, AND STORAGE MEDIUM WHICH STORES THE PROGRAM

TECHNICAL FIELD

The present invention relates to a technique for generating an image having a high bit depth by using a plurality of images.

Priority is claimed on Japanese Patent Application No. 2007-267613, filed Oct. 15, 2007, the contents of which are incorporated herein by reference.

BACKGROUND ART

For multi-view imaging systems, FIG. 11 is a diagram showing an example of camera arrangement having a straight-line alignment, FIG. 12 is a diagram showing another example of camera arrangement having a planar arrangement, FIG. 13 is a diagram showing another example of camera arrangement having an arc arrangement, and FIG. 14 is a diagram showing another example of camera arrangement having a spherical arrangement.

The multi-view imaging systems for imaging a scene in different directions have been developed. In the multi-view imaging systems, the camera arrangement has various forms such as a one-dimensional arrangement on a straight line as shown in FIG. 11, a two-dimensional arrangement on a plane as shown in FIG. 12, an arc arrangement as shown in FIG. 13, or a spherical arrangement as shown in FIG. 14. Using such multi-view imaging systems makes it possible to archive video scenes in many directions.

In addition, there is a technique called "image synthesis" for generating image information at a virtual camera position (at which imaging is not performed) by using camera images obtained by multi-view imaging.

In the image synthesis, it is assumed that a camera parameter which indicates the spatial direction in which the original video image was obtained is known. The image synthesis can be performed by various methods.

For example, there is a method of performing synthesis by estimating depth information. First, disparity information is obtained by searching corresponding points between original video images, and depth information of the relevant scene is estimated based on the disparity information. Then, depth information at the virtual camera position is estimated, and corresponding image information is generated using image information of the original cameras (see Non-Patent Document 1).

In another example of the methods, no estimation of depth information is performed, but image information at the virtual camera position is directly generated using disparity information of original images (see Non-Patent Document 2).

In another example, a plurality of camera images are used for estimating a three-dimensional model information of an object which is present in the relevant scene, and an image of the model projected from the virtual camera position is generated (see Non-Patent Document 3).

In the above-described imaging systems, cameras having the same bit depth (i.e., degradation) are generally used, however, those having different bit depths may be used. It is possible to reduce the amount of obtained image information by using a combination of a camera having a high bit depth and a camera having a low bit depth.

Tone mapping is a method for obtaining an image having a high bit depth based on an image having a low bit depth (see Non-Patent Document 4). This is a method for transforming quantized values into a signal having a higher dynamic range by means of mapping.

Non-Patent Document 1: Keita Takahashi and Takeshi Naemura, "Layered Light-Field Rendering with Focus Measurement", EURASIP Signal Processing: Image Communication, vol. 21, no. 6, pp. 519-530 (2006.7).

Non-Patent Document 2: M. Droese, T. Fujii, and M. Tanimoto, "Ray-Space Interpolation Constraining Smooth Disparities Based On Loopy Belief Propagation", Proc. of IWSSIP2004, pp. 247-250, Poznan, Poland, September 2004.

Non-Patent Document 3: Takashi Matsuyama, Takeshi Takai, Xiaojunn Wu, and Shohei Nobuhara, "Generation, Editing, and Visualization of 3D Video", Proceedings of The Virtual Reality Society of Japan, Vol. 7, No. 4, pp. 521-532, 2002.12.

Non-Patent Document 4: E. Reinhard, M. Stark, P. Shirley, and J. Ferwerda, "Photographic Tone Reproduction for Digital Images", presented at SIGGRAPH, 2002.

DISCLOSURE OF INVENTION

Problem to be Solved by the Invention

For a novel technique found by the inventors of the present invention for processing a multi-view image having different bit depths, an object of the present invention is to restore information which a low bit-depth image does not have and is represented by a high dynamic range, thereby improving a subjective image quality of the low bit-depth image

Means for Solving the Problem

In conventional techniques, a multi-view video image including different bit depths is not handled. That is, the object of the present invention is generated from a novel technical concept of handling a multi-view video image including different bit depths.

When using cameras having different bit depths in a multi-view imaging system, both an image having a high bit depth and an image having a low bit depth are present. Even when using cameras having the same bit depth, the amount of information can be reduced by decreasing the bit depth of a part of the cameras, which is preferable for the compression of a multi-view image. Also in such a case, both an image having a high bit depth and an image having a low bit depth are present.

In the above cases, image information corresponding to a low bit depth does not have information represented by a high dynamic range. Therefore, in comparison with image information of a camera position at which imaging was performed with a high bit depth, image information of a camera position at which imaging was performed with a low bit depth has a low subjective image quality.

Therefore, the present invention solves such a problem, and restores information which an image of a low bit depth has lost and is represented by a high dynamic range, thereby improving the subjective image quality of the image of the low bit depth The present invention will be generally explained. For example, the total amount of image information to be processed can be reduced by imaging a scene using a plurality of cameras having different bit depths. Therefore, in this case, the amount of code of a multi-view video image can be considerably reduced.

The bit depth indicates a dynamic range of a signal, such as 8 bits or 10 bits. When there is a range in which no imaging was performed (that is, when the dynamic range is low), information of the relevant part is lost, which degrades the subjective image quality and causes a problem for the reduction of the amount of code of a multi-view video image.

The present invention solves the above problem by restoring such lost information of the relevant range. In conventional techniques, a multi-view video image having different bit depths is not handled. The object of the present invention is generated from a novel technical concept of handling a multi-view video image including different bit depths.

In order to achieve the object, the present invention uses a technical method of restoring information having a high bit depth of a target image by using information having the high bit depth obtained by another camera. Accordingly, when handling a multi-view video image obtained using a plurality of cameras having different bit depths, it is possible to reduce the total amount of image information to be processed without degrading the subjective image quality.

The present invention provides an image generation method for generating image information of an image C by using an image A and an image B having a bit depth higher than that of image A, the method comprising:

an image bit-depth increasing step that generates image C having the same bit depth as image B by increasing the bit depth of image A by means of tone mapping;

a corresponding point estimating step that estimates presence or absence of a point in image B corresponding to each pixel position of image C and also estimates the position of the relevant corresponding point; and a corresponding image assigning step that assigns, to each pixel position in image C for which the corresponding point estimating step estimates that there is a corresponding point, image information of the corresponding position in image B.

In accordance with the above image generation method, it is possible to generate an image having a high bit depth corresponding to a desired image by using information of a high dynamic range included in another image. If the other image does not have an image signal corresponding to a target pixel position for the generation, image information having a bit depth increased from the original low bit depth by means of tone mapping can be used for preventing missing of image information.

In the corresponding point estimation, corresponding point information may be provided as input data, or each corresponding point may be searched for by using image information. When providing the corresponding point information as input data, depth information or geometric information of the relevant scene may be estimated in advance, and then corresponding points between the images may be estimated.

When searching for each corresponding point, the absolute value of each difference between corresponding pixels (i.e., between each pixel of image C and one or more pixel candidates of image B) may be computed. When the minimum absolute value is smaller than or equal to a predetermined threshold, a point which produces the minimum value may be estimated to be a corresponding point. When the minimum absolute value is larger than the threshold, it may be estimated that there is no corresponding point.

It is also preferable to store the threshold together with the relevant image information having a low bit depth by means of filing. When generating image information having a high bit depth using the stored image information having the low bit depth, the same image can always be generated by using the threshold included in the relevant file.

When imaging a scene in a plurality of directions by using cameras having different bit depths, an image having a high bit depth corresponding to an image of a camera having a low bit depth can be generated using an image of another camera having a high bit depth. This method can be applied not only to a multi-view image but also to a video image obtained by a single camera. That is, when frames in a video image have different bit depths, an image having a high bit depth corresponding to an image of a frame having a low bit depth can be generated using an image of another frame having a high bit depth.

The above method may further comprise an image interpolation step that generates image information at each pixel position in image C for which the corresponding point estimating step estimates that there is no corresponding point, by means of interpolation using the image information assigned by the corresponding image assigning step.

In this case, when the relevant other image does not have an image signal corresponding to a target pixel position for the generation, target image information is generated by means of interpolation using an already-generated image signal having the high bit depth at a peripheral position, thereby preventing missing of image information.

The present invention also provides an image generation method for generating image information of an image C by using an image A and an image B having a bit depth higher than that of image A, the method comprising:

an image bit-depth increasing step that generates an image D having the same bit depth as image B by increasing the bit depth of image A by means of tone mapping;

a corresponding point estimating step that estimates presence or absence of a point in image B corresponding to each pixel position of image D and also estimates the position of the relevant corresponding point;

a corresponding image assigning step that assigns, to a pixel position in an image E equal to each pixel position in image D for which the corresponding point estimating step estimates that there is a corresponding point, image information of the corresponding position in image B;

an image interpolation step that generates image information at a pixel position in image E equal to each pixel position in image D for which the corresponding point estimating step estimates that there is no corresponding point, by means of interpolation using the image information assigned by the corresponding image assigning step;

an image bit-depth decreasing step that generates an image F having the same bit depth as image A by decreasing the bit depth of image E by means of tone mapping;

a difference generating step that computes a difference between image information at each pixel position in image A and image information at the same pixel position in image F; and an image information assigning step wherein:

when the difference at each pixel position computed by the difference generating step is smaller than or equal to a threshold, the image information assigning step assigns image information of image E to each corresponding pixel position in image C, and, when the difference at each pixel position computed by the difference generating step is larger than the threshold, the image information assigning step assigns image information based on image information of image D to each corresponding pixel position in image C.

In a typical example, when the difference at each pixel position computed by the difference generating step is larger than the threshold:

(i) the image information assigning step assigns the image information of image D to each corresponding pixel position in image C, or (ii) the image information assigning step assigns a weighted average between the image information of image D and the image information of image E to each corresponding pixel position in image C.

In accordance with the above image generation method, if there is an error in the corresponding point estimation between a desired image and another image, then instead of using an image having a high bit depth generated by a method based on the above-described invention, (i) image information obtained by increasing the original low bit depth by means of tone mapping, or (ii) a weighted average between the generated image information having the high bit depth and the image information obtained by increasing the original low bit depth by means of tone mapping, may be used for reducing degradation of image quality due to estimation error.

The present invention also provides an image generation method for generating image information of an image C by using an image A and an image B which have the same bit depth, the method comprising:

a reference image bit-depth decreasing step that generates an image G having a bit depth lower than that of image A by decreasing the bit depth of image A by means of tone mapping;

an image bit-depth increasing step that generates an image D having the same bit depth as image A by increasing the bit depth of image G by means of tone mapping;

a corresponding point estimating step that estimates presence or absence of a point in image B corresponding to each pixel position of image D and also estimates the position of the relevant corresponding point;

a corresponding image assigning step that assigns, to a pixel position in an image E equal to each pixel position in image D for which the corresponding point estimating step estimates that there is a corresponding point, image information of the corresponding position in image B;

an image interpolation step that generates image information at a pixel position in image E equal to each pixel position in image D for which the corresponding point estimating step estimates that there is no corresponding point, by means of interpolation using the image information assigned by the corresponding image assigning step;

an image bit-depth decreasing step that generates an image F having the same bit depth as image G by decreasing the bit depth of image E by means of tone mapping;

a difference generating step that computes a difference between image information at each pixel position in image G and image information at the same pixel position in image F;

a threshold setting step that sets a threshold;

an image information assigning step wherein:

when the difference at each pixel position computed by the difference generating step is smaller than or equal to a threshold, the image information assigning step assigns image information of image E to each corresponding pixel position in image C, and, when the difference at each pixel position computed by the difference generating step is larger than the threshold, the image information assigning step assigns image information based on image information of image D to each corresponding pixel position in image C;

a generated difference summing step that computes the sum of differences in image information at the relevant pixel positions between image C obtained by the image information assigning step and image A; and a threshold determination step that determines the threshold which produces the minimum value in the sums of the differences computed by the generated difference summing step based on a result of repetition of the image selecting information assigning step and the generated difference summing step while changing the threshold set by the threshold setting step within a predetermined range.

In a typical example, when the difference at each pixel position computed by the difference generating step is larger than the threshold:

(i) the image information assigning step assigns the image information of image D to each corresponding pixel position in image C, or (ii) the image information assigning step assigns a weighted average between the image information of image D and the image information of image E to each corresponding pixel position in image C.

In accordance with the above image generation method, in conversion of the bit depth of an image to a low value then to a high value, when generating the image having the high bit depth by the above-described method, the magnitude of degradation due to an error in the corresponding point estimation is measured, and a threshold for selecting the image having the high bit depth generated based on the above-described method can be determined while minimizing the degradation. The magnitude of the degradation can be measured because there is also image information of the original high bit depth.

The threshold parameter can be used as explained below. After the threshold is estimated, the value is appended as a threshold parameter to image information of a low bit depth. For example, the threshold parameter is also stored in a file together with the image having the low bit depth and another relevant image. No image information relating to an image before the conversion to the low bit depth is included in the file. Therefore, image information having a bit depth lower than the original image is subjected to filing, which decreases the file size. When reading the file, an image having the high bit depth can be generated based on the image of the low bit depth and the other image by using the above threshold parameter, where the image having the high bit depth has a minimum degradation in the subjective image quality.

In addition, when the difference at each pixel position computed by the difference generating step is larger than the threshold and the above method (ii) is used, the image having a bit depth increased using an image having a low bit depth by means of tone mapping is not applied to the signal of the generated image, but a weighted average between the image having the increased bit depth and the image originally having a high bit depth is used. Therefore, it is possible to reduce blur in an image due to the bit depth increase (from an image having a low bit depth) by means of tone mapping.

The present invention also provides image generation apparatuses which generates images in accordance with the above methods.

Effect of the Invention

In accordance with the present invention, for image information obtained at a camera position having a low bit depth, image information having a high bit depth can be generated using image information obtained at a camera position having a high bit depth, thereby reducing degradation in the subjective image quality.

REFERENCE SYMBOLS

Figure 1:
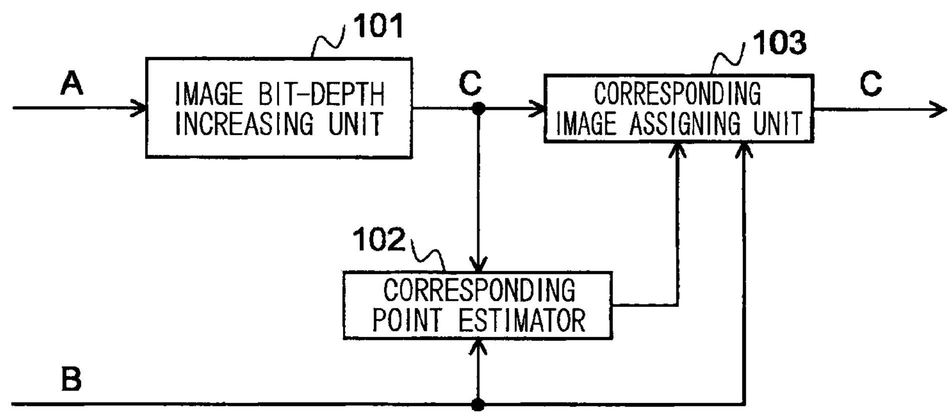
FIG. 1 is a diagram showing the structure of an image generation apparatus as a first embodiment of the present invention.

101, 201, 301, 401 image bit-depth increasing unit
102, 202, 302, 402 corresponding point estimator
103, 203, 303, 403 corresponding image assigning unit
204, 304, 404 image interpolator
305, 405 image bit-depth decreasing unit
306, 406 difference generator
307, 407 image selector
308, 408 image generator
409 generated difference summing unit
410 threshold setting unit
411 threshold determination unit
412 reference image bit-depth decreasing unit

BEST MODE FOR CARRYING OUT THE INVENTION

Embodiment of the image generation apparatus of the present invention will be shown with reference to the drawings.

First Embodiment

In a first embodiment, an image A having a low bit depth and an image B having a high bit depth, which were obtained by different cameras, are used for generating an image C which corresponds to image A but has a high bit depth (corresponding to that of image B). Here, color of all signals obtained by cameras is set using YUV signals (i.e., luminance signal Y and chrominance signals U and V). In the present embodiment, only the signal Y is processed.

FIG. 1 shows a general structure of the apparatus. That is, the image generation apparatus of the present embodiment has an image bit-depth increasing unit 101 for increasing the bit depth of image A so as to generate image C having the same bit depth as image B, a corresponding point estimator 102 for estimating presence or absence of a point in image B corresponding to each pixel position of image C and also for estimating the position of the relevant corresponding point, and a corresponding image assigning unit 103 for assigning, to each pixel position in image C for which the corresponding point estimator 102 estimates that there is a corresponding point, image information of the corresponding position in image B.

The image bit-depth increasing unit 101 increases the bit depth of the relevant image by using a method (tone mapping) disclosed in Non-Patent Document 4 so as to generate image C.

The corresponding point estimator 102 uses camera parameters or a known matching technique for assuming one or more candidates of a pixel (in image B) corresponding to each pixel in image C, and computes an absolute value of the difference between each pair of corresponding pixels. When the minimum value of the computed absolute value(s) is smaller than or equal to a predetermined threshold, the corresponding point estimator 102 estimates the point which produces the minimum value to be the corresponding point. When the minimum value of the computed absolute value(s) is larger than the predetermined threshold, the corresponding point estimator 102 estimates that there is no point corresponding to the relevant pixel in image C.

Figure 2:
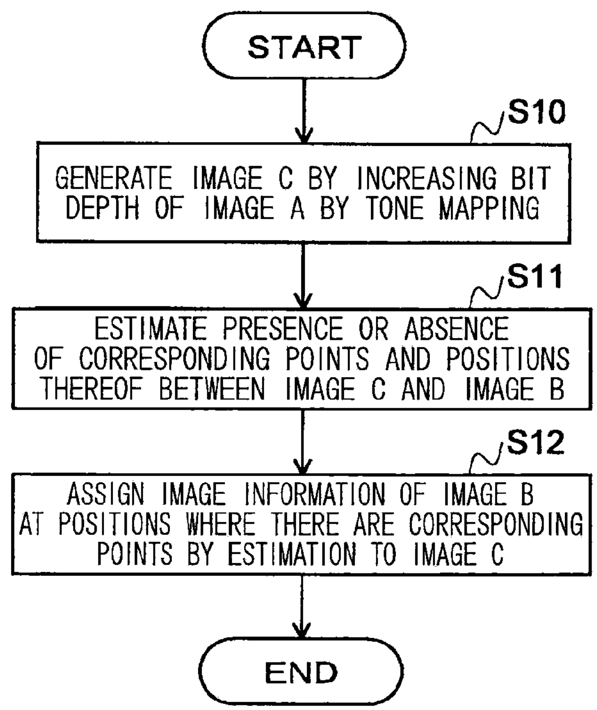
FIG. 2 is a flowchart showing the operation of the image generation apparatus of the embodiment.

Based on the above premise, the image generation apparatus in FIG. 1 operates as explained below. FIG. 2 is a flowchart showing the operation.

First, the image bit-depth increasing unit 101 generates image C by increasing the bit depth of image A by tone mapping (see step S10). The corresponding point estimator 102 estimates the presence or absence of the corresponding points and positions thereof between image C and image B by means of the above-described method (see step S11). To each pixel of image C for which the corresponding point estimator 102 estimates that there is a corresponding point, the corresponding image assigning unit 103 assigns image information of the corresponding point in image B (see step S12). Image C is generated by the above operation.

The image bit-depth increasing unit 101 may employ another tone mapping method.

The corresponding point estimator 102 computes the absolute value of each difference between the relevant pixels in the above operation. However, estimation may be performed using a block consisting of a plurality of pixels whose center pixel is the target pixel for estimation. For example, for each pixel in image C, one or more candidates of a corresponding pixel in image B are assumed, and the total sum of absolute values of differences from a plurality of pixels which form a block and whose center is each candidate. The position of the candidate which produces the minimum value of the total sums may be estimated to be the corresponding point.

In the above example, image A having a low bit depth and image B having a high bit depth, which were obtained by different cameras, are used for generating image C having the high bit depth. However, an image A having a low bit depth and an image B having a high bit depth, which were obtained by a common camera at different times, may be used for generating an image C having the high bit depth.

In addition, although image A and image B are used for generating image C in the above operation, a plurality of images B may be used. An example of using two images B (B1 and B2) will be shown below. The operation of this case will be explained while the structure is the same as the above.

First, the image bit-depth increasing unit 101 generates image C by increasing the bit depth of image A by tone mapping.

The corresponding point estimator 102 estimates the presence or absence of the corresponding points and positions thereof between image C and image B1 by means of the above-described method. To each position of image C for which the corresponding point estimator 102 estimates that there is a corresponding point, the corresponding image assigning unit 103 assigns image information of the corresponding position in image B1.

Similarly, the corresponding point estimator 102 estimates the presence or absence of the corresponding points and positions thereof between image C and image B2. To each position of image C for which the corresponding point estimator 102 estimates that there is a corresponding point, the corresponding image assigning unit 103 assigns image information of the corresponding position in image B2.

Image C is generated by the above operation.

If it is estimated that there are corresponding points in both images B1 and B2, (i) priority may be given to any predetermined one of B1 and B2 for assigning image information thereof to image C, (ii) image information of B1 or B2 which has smaller difference from the corresponding pixel in image C may be assigned to image C, or (iii) an average of image information of images B1 and B2 may be assigned to image C.

When there are three or more images B, an image C having a high bit depth can also be generated similarly.

In other embodiments explained below, when there are a plurality of images B, a similar operation can be performed.

Second Embodiment

Similar to the first embodiment, in a second embodiment, an image A having a low bit depth and an image B having a high bit depth, which were obtained by different cameras, are used for generating an image C which corresponds to image A but has the high bit depth. However, if no corresponding point is found, image generation is performed by means of interpolation using image information of peripheral pixels having the high bit depth.

Figure 3:
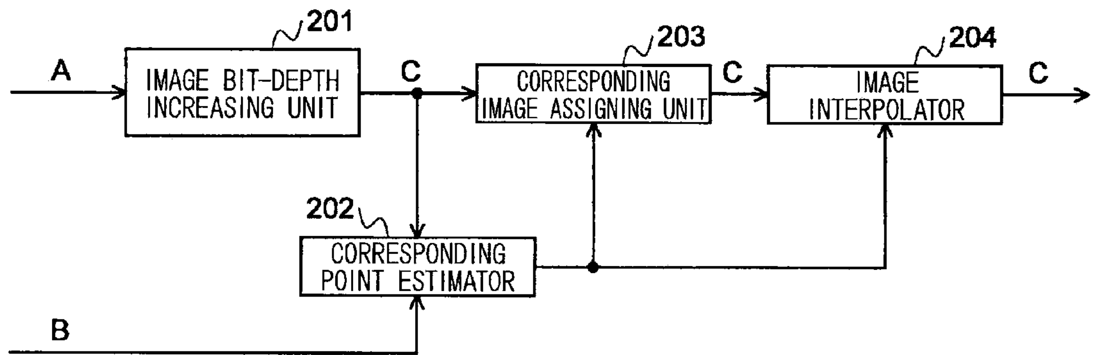
FIG. 3 is a diagram showing the structure of an image generation apparatus as a second embodiment of the present invention.

FIG. 3 shows a general structure of the apparatus. That is, the image generation apparatus of the present embodiment has an image bit-depth increasing unit 201 for increasing the bit depth of image A so as to generate image C, a corresponding point estimator 202 for estimating presence or absence of a point in image B corresponding to each pixel position of image C and also estimating the position of the relevant corresponding point, a corresponding image assigning unit 203 for assigning, to each pixel position in image C for which the corresponding point estimator 202 estimates that there is a corresponding point, image information of the corresponding position in image B, and an image interpolator 204 for generating image information at each pixel position in image C for which the corresponding point estimator 202 estimates that there is no corresponding point, by using the image information assigned by the corresponding image assigning unit 203.

The image interpolator 204 generates the image information at each pixel position in image C for which it is estimated that there is no corresponding point, by using the image information at pixel positions in image B, which was assigned due to an estimation result that there are corresponding points. More specifically, linear interpolation is performed in accordance with distances measured from the pixel positions to which the image information in image B was assigned.

Figure 4:
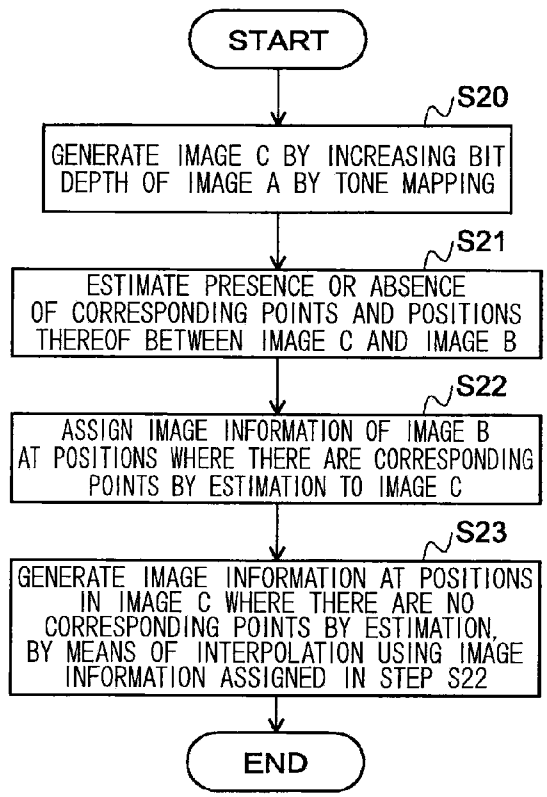
FIG. 4 is a flowchart showing the operation of the image generation apparatus of the embodiment.

Based on the above premise, the image generation apparatus in FIG. 3 operates as explained below. FIG. 4 is a flowchart showing the operation.

First, the image bit-depth increasing unit 201 generates image C by increasing the bit depth of image A by tone mapping (see step S20). The corresponding point estimator 202 estimates the presence or absence of the corresponding points and positions thereof between image C and image B (see step S21). To each pixel of image C for which the corresponding point estimator 202 estimates that there is a corresponding point, the corresponding image assigning unit 203 assigns image information of the corresponding point in image B (see step S22). For each pixel position for which the corresponding point estimator 202 estimates that there is no corresponding point, the image interpolator 204 generates image information by means of interpolation using the image information which was already assigned by the corresponding image assigning unit 203 (see step S23). Image C is generated by the above operation.

The image interpolator 204 generates the relevant image information by means of linear interpolation in the above operation. However, the image information may be generated through a non-linear process. In either case, the image information is generated using the image information which was already assigned by the corresponding image assigning unit 203.

Third Embodiment

Similar to the first embodiment, in a third embodiment, an image A having a low bit depth and an image B having a high bit depth, which were obtained by different cameras, are used for generating an image C which corresponds to image A but has the high bit depth (corresponding to that of image B). However, generated image information is applied only to each pixel position at which difference between the original image A and an image obtained by reducing the dynamic range of the generated image information is small.

In the following example, an image D is an image obtained by increasing the bit depth of image A by means of tone mapping in the first step, and an image E is a temporary image for processing and has the same size (same pixel structure) as image D.

In addition, an image F is generated by decreasing the bit depth of image E by means of tone mapping and is a temporary image (for processing) having the low bit depth (i.e., the same bit depth as image A).

Figure 5:
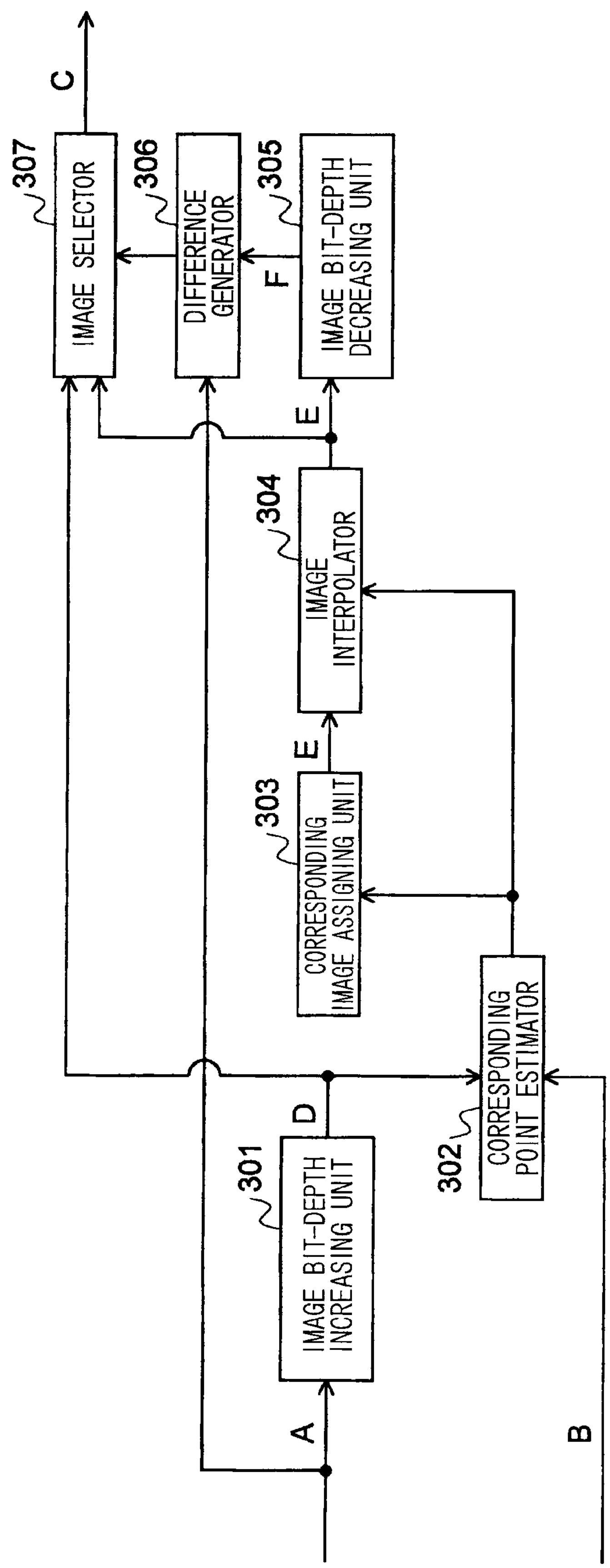
FIG. 5 is a diagram showing the structure of an image generation apparatus as a third embodiment of the present invention.

FIG. 5 shows a general structure of the apparatus. That is, the image generation apparatus of the present embodiment has an image bit-depth increasing unit 301 for increasing the bit depth of image A by means of tone mapping so as to generate image D, a corresponding point estimator 302 for estimating presence or absence of a point in image B corresponding to each pixel position of image D and also estimating the position of the relevant corresponding point, a corresponding image assigning unit 303 for assigning, to a pixel position in image E equal to each pixel position in image D for which the corresponding point estimator 302 estimates that there is a corresponding point, image information of the corresponding position in image B, an image interpolator 304 for generating image information at a pixel position in image E equal to each pixel position in image D for which the corresponding point estimator 302 estimates that there is no corresponding point, by using the image information assigned by the corresponding image assigning unit 303, an image bit-depth decreasing unit 305 for decreasing the bit depth of image E by means of tone mapping so as to generate image F having the low bit depth, a difference generator 306 for computing a difference between image information at each pixel position in image A and image information at the same pixel position (as the pixel position in image A) in image F, and an image selector 307. When the difference at each pixel position computed by the difference generator 306 is smaller than or equal to a threshold, the image selector 307 assigns the relevant image information of image E to each corresponding pixel position in image C. When the difference at each pixel position computed by the difference generator 306 is larger than the threshold, the image selector 307 assigns the relevant image information of image D to each corresponding pixel position in image C.

The image bit-depth decreasing unit 305 generates the image information (i.e., image F) having the low bit depth, by using, for example, a method shown in Non-Patent Document 4.

The difference generator 306 generates the above-described difference at each pixel position.

The image selector 307 predetermines the threshold for the difference, and compares the threshold with the difference obtained by the difference generator 306.

Figure 6:
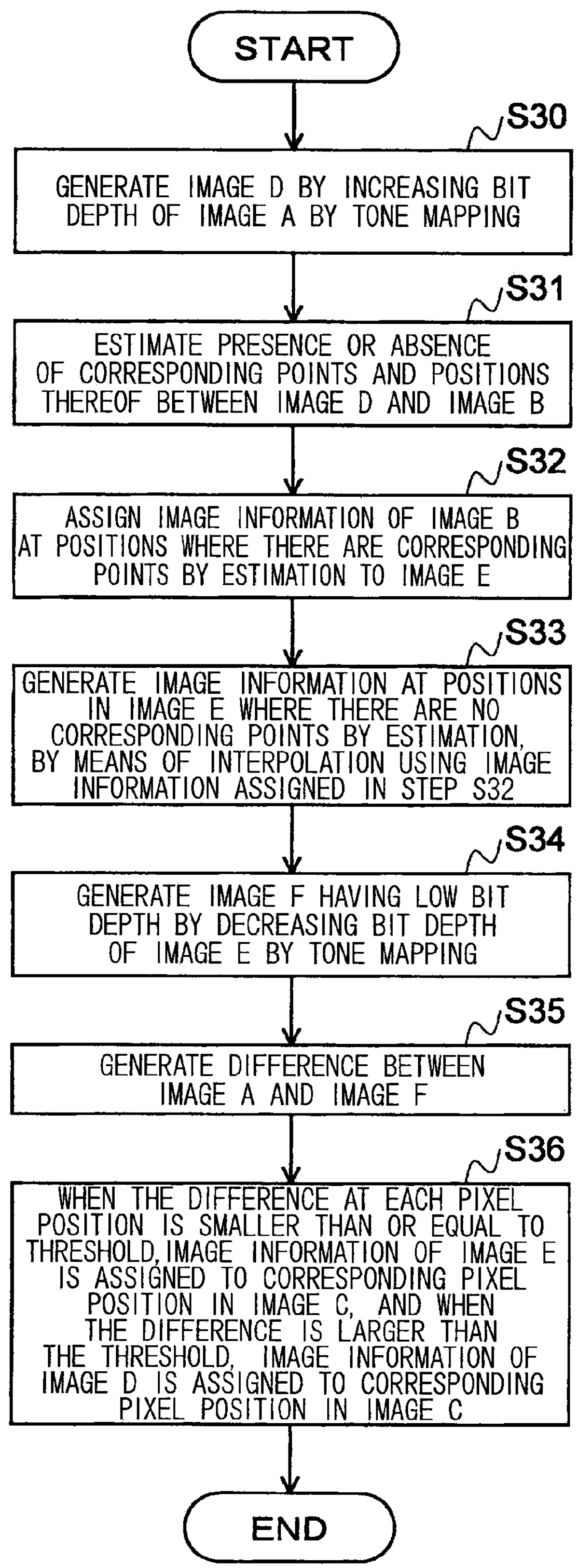
FIG. 6 is a flowchart showing the operation of the image generation apparatus of the embodiment.

Based on the above premise, the image generation apparatus in FIG. 5 operates as explained below. FIG. 6 is a flowchart showing the operation.

First, the image bit-depth increasing unit 301 generates image D by increasing the bit depth of image A by tone mapping (see step S30). The corresponding point estimator 302 estimates the presence or absence of the corresponding points and positions thereof between image D and image B (see step S31). The corresponding image assigning unit 303 assigns image information of each position in image B, for which the corresponding point estimator 302 estimates that there is a corresponding point, to image E (see step S32).

For each position for which the corresponding point estimator 302 estimates that there is no corresponding point, the image interpolator 304 generates image information of image E by means of interpolation using the image information which was already assigned by the corresponding image assigning unit 303 (see step S33).

The image bit-depth decreasing unit 305 generate image F having the low bit depth by decreasing the bit depth of image E by means of tone mapping (see step S34). The difference generator 306 generates the difference between image A and image F (see step S35).

In accordance with the difference obtained by the difference generator 306, the image selector 307 selects image E or image D for each pixel position, so as to generate image C (see step S36).

The image bit-depth decreasing unit 305 may generate the image having the low bit depth by using another method.

The difference generator 306 may generate a difference between blocks, where the target pixel is positioned at the center of each block (refer to the first embodiment).

In the image selector 307, (i) when the difference at each pixel position computed by the difference generator 306 is smaller, the relevant image information of image E is assigned to each corresponding pixel position in image C, and when the difference at each pixel position computed by the difference generator 306 is larger, the relevant image information of image D is assigned to each corresponding pixel position in image C.

Figure 7:
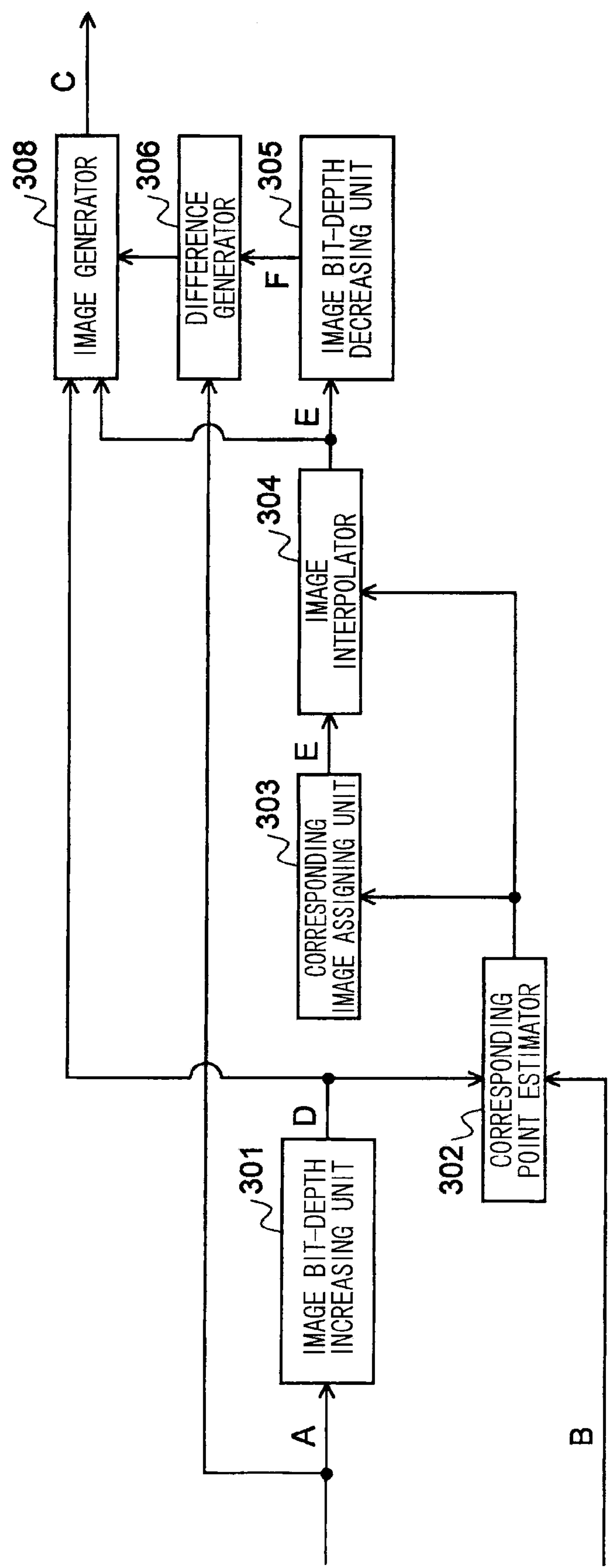
FIG. 7 is a diagram showing the structure of an image generation apparatus as a variation of the embodiment.

In place of the image selector 307, an image generator 308 shown in FIG. 7 may be provided.

FIG. 7 shows a general structure of the relevant apparatus. In this case, (i) when the difference at each pixel position computed by the difference generator 306 is smaller than or equal to a threshold, the image generator 308 assigns the relevant image information of image E to each corresponding pixel position in image C, and (ii) when the difference at each pixel position computed by the difference generator 306 is larger than the threshold, the generator 308 assigns a value obtained by weighted averaging between the relevant image information of image D and the relevant image information of image E to each corresponding pixel position in image C.

In accordance with the above method, when the difference is large, not image D obtained by increasing the bit depth by tone mapping, but a weighted average between the tone-mapped image D and image E generated using another image can be used. This method is preferable when degradation of the tone-mapped image D is large.

Fourth Embodiment

In a fourth embodiment, there are images A and B which were obtained by a common camera and have the same bit depth, and an image C close to image A is generated using a reduced image of image A and image B. Here, generated image information is applied only to each pixel position at which difference between the original image A and an image obtained by reducing the dynamic range of the generated image information is small. The present embodiment also has a distinctive feature of estimating a threshold applied to the difference between two images at each pixel position.

Figure 8:
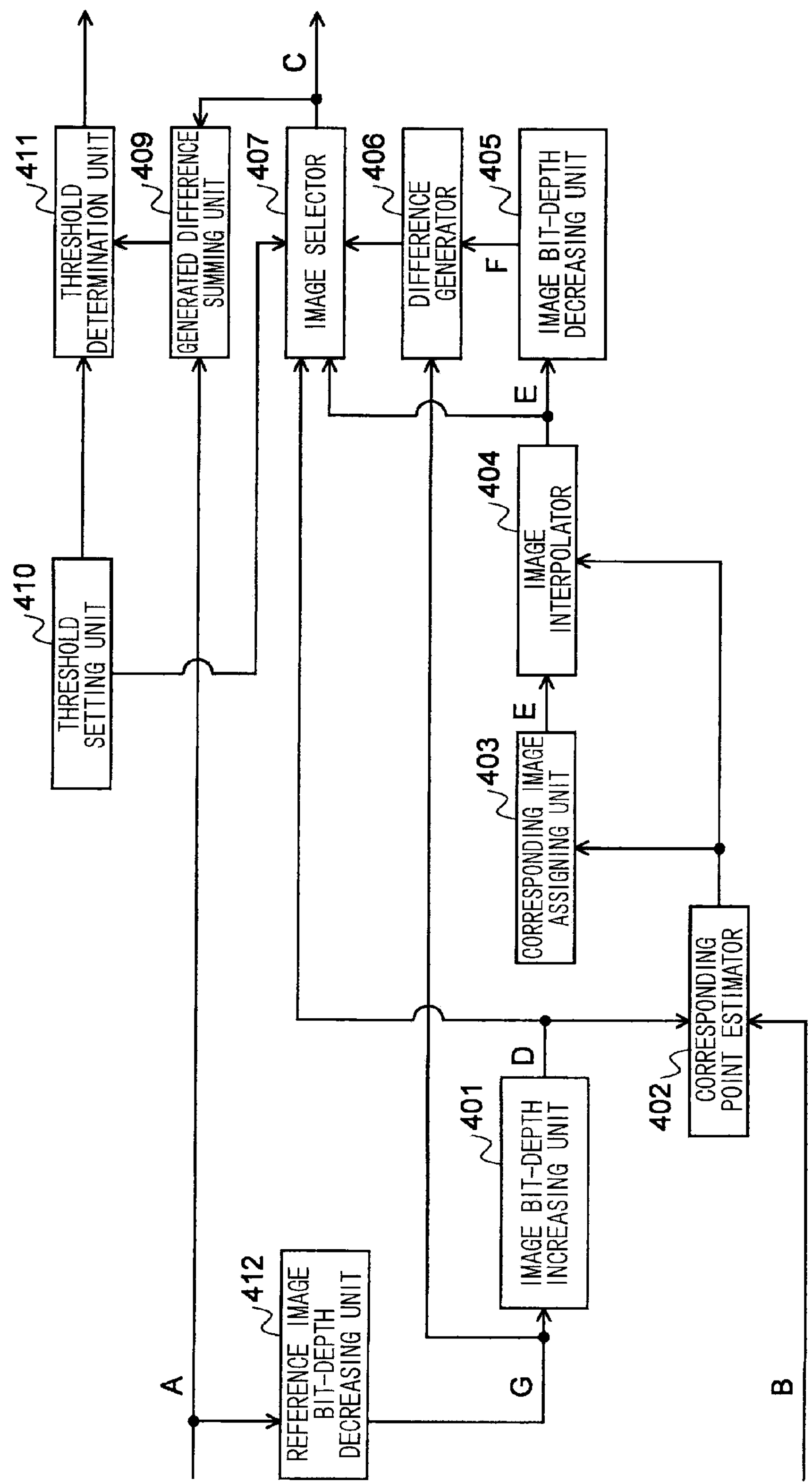
FIG. 8 is a diagram showing the structure of an image generation apparatus as a fourth embodiment of the present invention.

FIG. 8 shows a general structure of the apparatus. That is, the image generation apparatus of the present embodiment has:

(i) a reference image bit-depth decreasing unit 412 for subjecting image A to tone mapping so as to generate an image G having a low bit depth, (ii) an image bit-depth increasing unit 401 for increasing the bit depth of image G by means of tone mapping so as to generate an image D having the same bit depth as images A and B, (iii) a corresponding point estimator 402 for estimating presence or absence of a point in image B corresponding to each pixel position of image D and also estimating the position of the relevant corresponding point, (iv) a corresponding image assigning unit 403 for assigning, to a pixel position in an image E (temporary image (for processing) having the same size as image D) equal to each pixel position in image D for which the corresponding point estimator 402 estimates that there is a corresponding point, image information of the corresponding position in image B, (v) an image interpolator 404 for generating image information at a pixel position in image E equal to each pixel position in image D for which the corresponding point estimator 402 estimates that there is no corresponding point, by using the image information assigned by the corresponding image assigning unit 403, (vi) an image bit-depth decreasing unit 405 for decreasing the bit depth of image E by means of tone mapping so as to generate image F having the low bit depth (the same bit depth as image G), (vii) a difference generator 406 for computing a difference between image information at each pixel position in image G and image information at the same pixel position in image F, (viii) a threshold setting unit 410 for setting a plurality of thresholds within a predetermined range, (ix) an image selector 407, wherein for each threshold set by the threshold setting unit 410, when the difference at each pixel position computed by the difference generator 406 is smaller than or equal to a threshold, the image selector 407 assigns the relevant image information of image E to each corresponding pixel position in image C, and when the difference at each pixel position computed by the difference generator 406 is larger than the threshold, the image selector 407 assigns the relevant image information of image D to each corresponding pixel position in image C, (x) a generated difference summing unit 409 for computing the sum of differences in image information at the relevant pixel positions between image C obtained by the image selector 407 and image A, and (xi) a threshold determination unit 411 for determining the threshold which produces the minimum value in the sums of the differences computed by the generated difference summing unit 409.

The threshold setting unit 410 increases the threshold by increments of 10 from 10 to 50.

Figure 9:
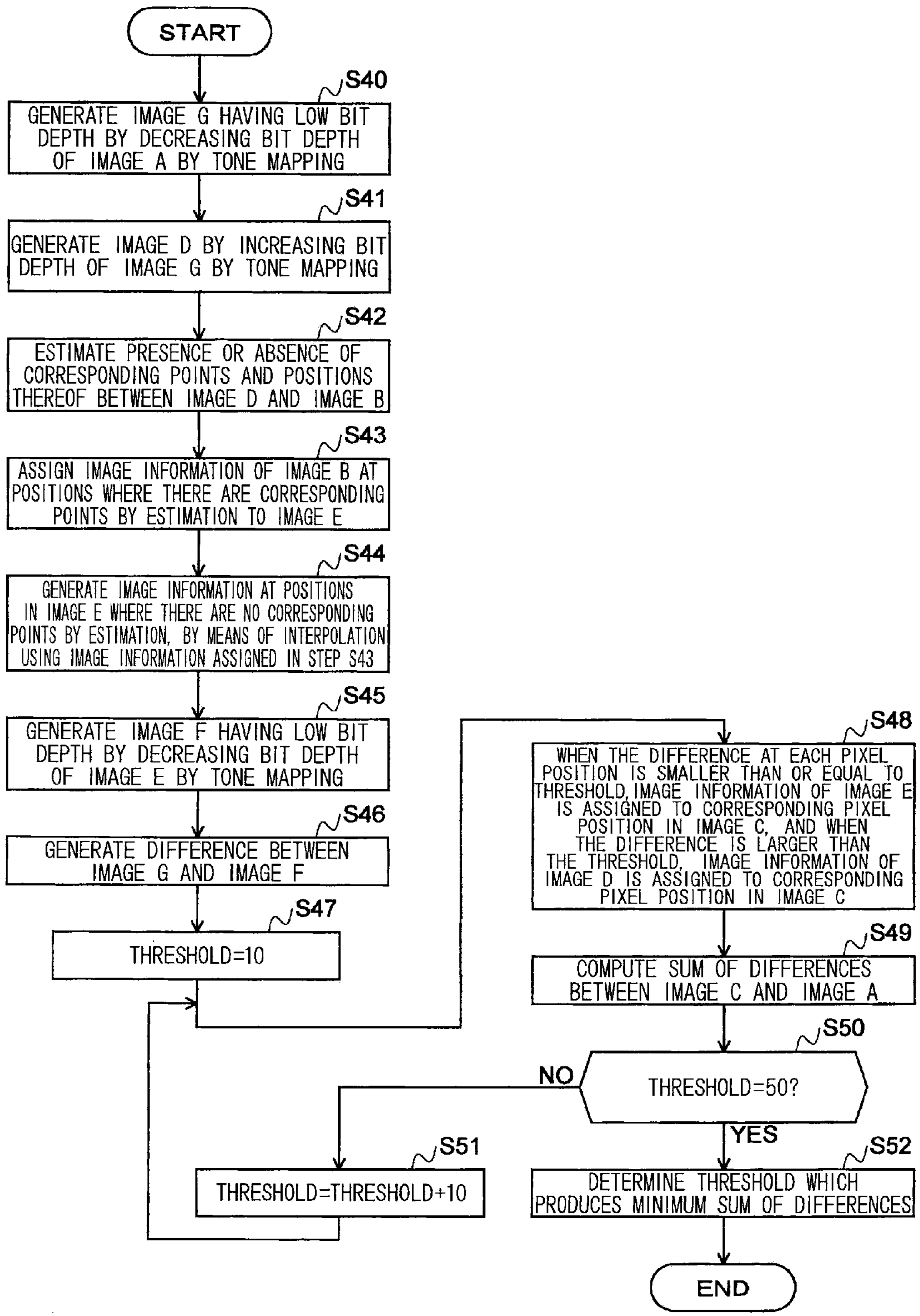
FIG. 9 is a flowchart showing the operation of the image generation apparatus of the embodiment.

Based on the above premise, the image generation apparatus in FIG. 8 operates as explained below. FIG. 9 is a flowchart showing the operation.

First, the reference image bit-depth decreasing unit 412 generates image G having a low bit depth by decreasing the bit depth of image A by means of tone mapping (see step S40)

The image bit-depth increasing unit 401 generates image D having the high bit depth (i.e., the same bit depth as images A and B) by using image G (see step S41).

The corresponding point estimator 402 estimates the presence or absence of the corresponding points and positions thereof between image D and image B (see step S42).

The corresponding image assigning unit 403 assigns image information of each position in image B, for which the corresponding point estimator 402 estimates that there is a corresponding point, to image E (see step S43).

For each position for which the corresponding point estimator 402 estimates that there is no corresponding point, the image interpolator 404 generates image information of image E by means of interpolation using the image information which was already assigned by the corresponding image assigning unit 403 (see step S44).

The image bit-depth decreasing unit 405 generate image F having the low bit depth by using image E (see step S45).

The difference generator 406 generates differences between image G and image F (see step S46).

Next, the threshold setting unit 410 sets the threshold to 10 (see step S47).

The image selector 407 compares the difference obtained by the difference generator 406 with the threshold, and selects image E or image D for each pixel position, so as to generate image C (see step S48).

The generated difference summing unit 409 computes the sum of the differences between image C and image A (see step S49).

The above operation executed by the threshold setting unit 410, the image selector 407, and the generated difference summing unit 409 is repeatedly performed while increasing the threshold by increments of 10 up to 50 (see steps S50 and S51).

Next, the threshold determination unit 411 determines the threshold which produces the minimum value obtained by the generated difference summing unit 409 (see step S52).

Figure 10:
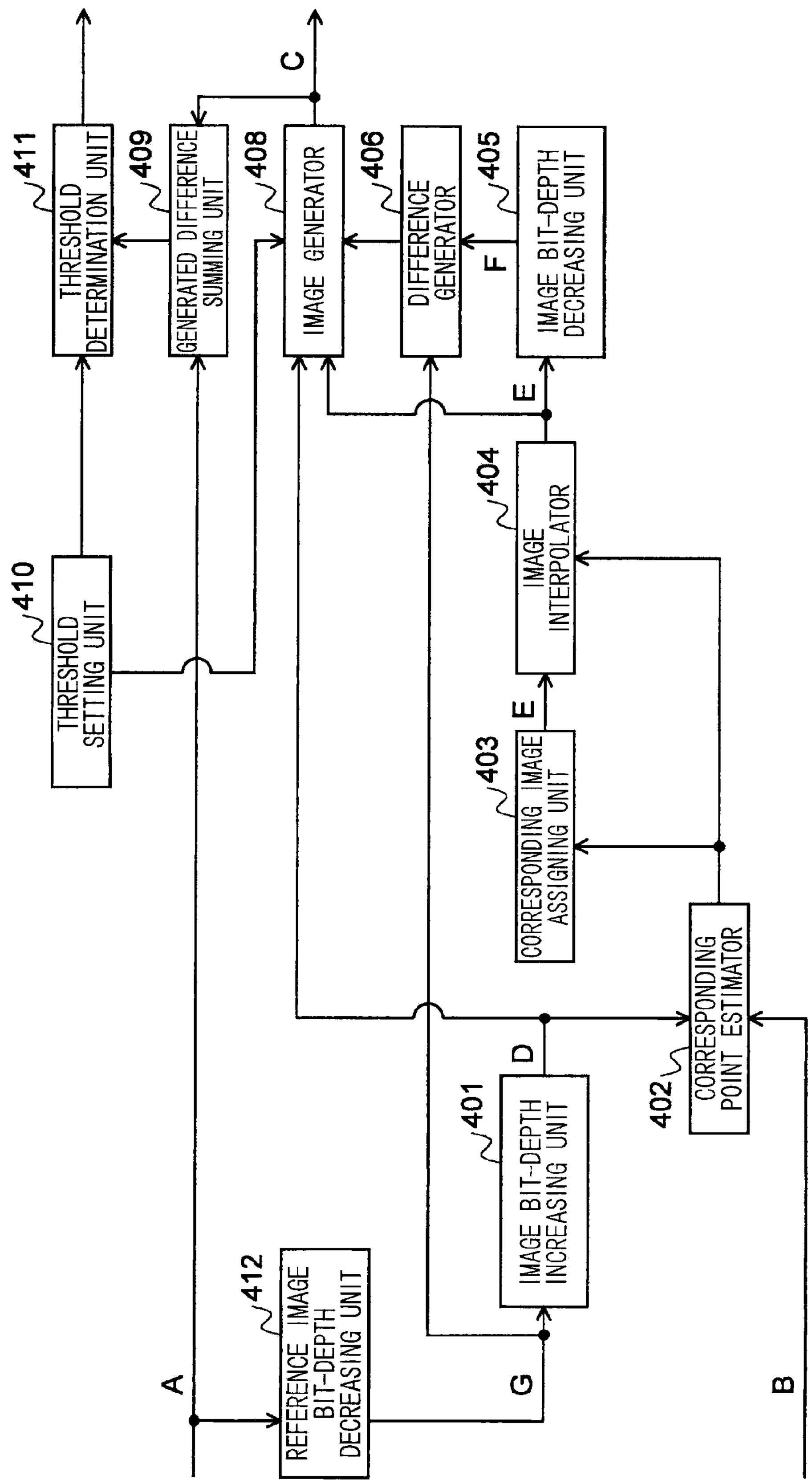
FIG. 10 is a diagram showing the structure of an image generation apparatus as a variation of the embodiment.
Figure 11:
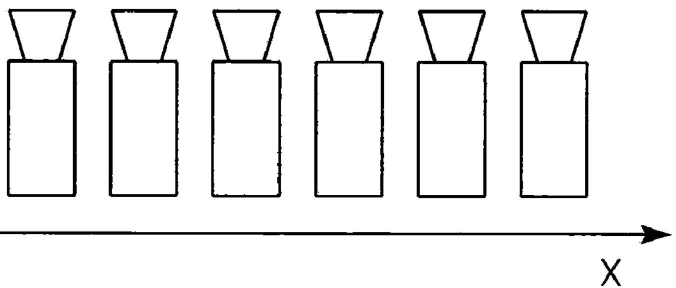
FIG. 11 is a diagram showing a multi-view imaging system having a straight-line alignment.
Figure 12:
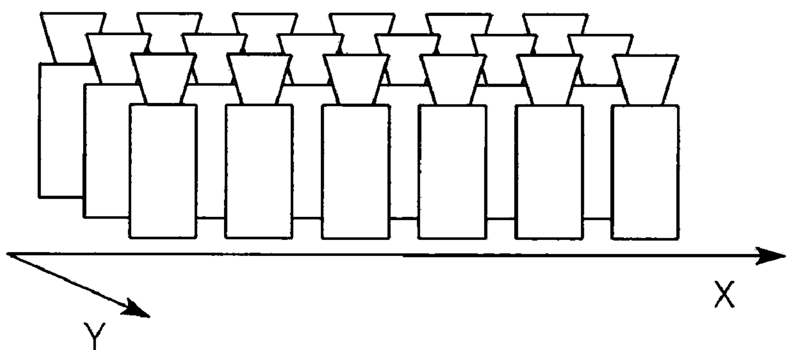
FIG. 12 is a diagram showing a multi-view imaging system having a planar arrangement.
Figure 13:
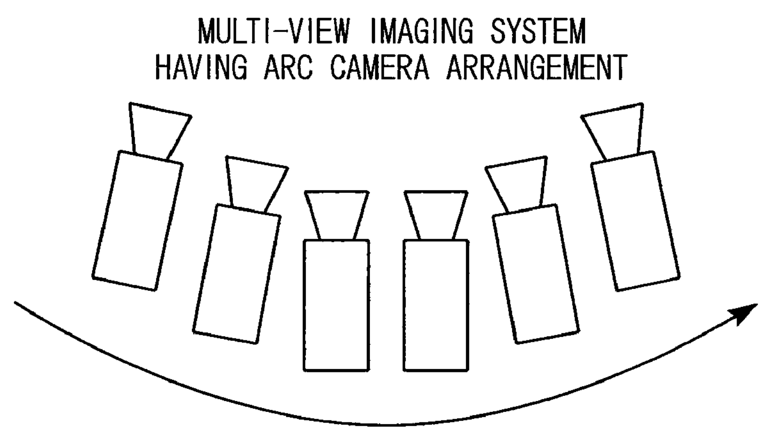
FIG. 13 is a diagram showing a multi-view imaging system having an arc arrangement.
Figure 14:
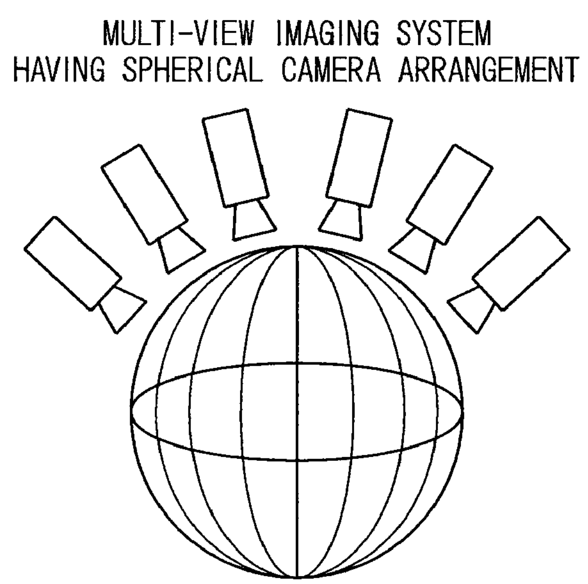
FIG. 14 is a diagram showing a multi-view imaging system having a spherical arrangement.

In the above structure, an image generator 408 may be used in place of the image selector 407. The general structure of the relevant apparatus is shown in FIG. 10.

In the image generator 408, (i) when the difference at each pixel position obtained by the difference generator 406 is small, the relevant image information of image E is assigned to the corresponding pixel position in image C, and (ii) when the difference at each pixel position obtained by the difference generator 406 is large, a value obtained by weighted averaging between the relevant image information of image D and the relevant image information of image E to the corresponding pixel position in image C.

In the above-described embodiments, operations for input images by a plurality of cameras were explained. However, the relevant methods can be applied, not only to such a multi-view image, but also to a video image by a single camera.

That is, if the bit depth of each frame in a video image is not constant, an image having a high bit depth corresponding to an image of a frame having a low bit depth can be generated using an image of another frame having the high bit depth.

In an example of the application, an image C having a high bit depth is generated using an image A of a frame having a low bit depth and an image B of another frame having the high bit depth.

In addition, although the signal Y is processed in the above embodiments, another color signal such as RGB may be processed.

The relevant methods can also be applied to a case in that in the YUV signal, the signal Y has a constant bit depth, but the signals U and V have non-constant bit depths. In such a case, the increase by an image bit-depth increasing unit is applied only to the signals U and V, and the signal Y is copied unchanged. The estimation by a corresponding point estimator may by performed, not using a signal having an increased bit depth based on the signal U or V, but using the signal Y.

The above-described image generating operation can also be implemented by a computer and a software program. Such a computer program may be provided by storing it in a computer-readable storage medium, or by means of a network.

INDUSTRIAL APPLICABILITY

In accordance with the present invention, for image information obtained at a camera position having a low bit depth, image information having a high bit depth can be generated using image information obtained at a camera position having a high bit depth, thereby reducing degradation in the subjective image quality.

The invention claimed is:

1. An image generation method for generating image information of a third image C by using a first image A and a second image B having a bit depth higher than that of image A, the method comprising:

an image bit-depth increasing step that generates the third image C having the same bit depth as image B by increasing the bit depth of the first image A by means of tone mapping;

a corresponding point estimating step that estimates presence or absence of a point in the second image B corresponding to each pixel position of the third image C and also estimates the position of the relevant corresponding point; and a corresponding image assigning step that assigns, to each pixel position in the third image C for which the corresponding point estimating step estimates that there is a corresponding point, image information of the corresponding position in the second image B.

2. The image generation method in accordance with claim 1, further comprising:

an image interpolation step that generates image information at each pixel position in the third image C for which the corresponding point estimating step estimates that there is no corresponding point, by means of interpolation using the image information assigned by the corresponding image assigning step.

3. An image generation program by which a computer executes the image generation method in accordance with claim 1.

4. A computer-readable storage medium which stores an image generation program by which a computer executes the image generation method in accordance with claim 1.

5. An image generation method for generating image information of a third image C by using a first image A and a second image B having a bit depth higher than that of image A, the method comprising:

an image bit-depth increasing step that generates a fourth image D having the same bit depth as image B by increasing the bit depth of the first image A by means of tone mapping;

a corresponding point estimating step that estimates presence or absence of a point in the second image B corresponding to each pixel position of the fourth image D and also estimates the position of the relevant corresponding point;

a corresponding image assigning step that assigns, to a pixel position in a fifth image E equal to each pixel position in the fourth image D for which the corresponding point estimating step estimates that there is a corresponding point, image information of the corresponding position in the second image B;

an image interpolation step that generates image information at a pixel position in the fifth image E equal to each pixel position in the fourth image D for which the corresponding point estimating step estimates that there is no corresponding point, by means of interpolation using the image information assigned by the corresponding image assigning step;

an image bit-depth decreasing step that generates a sixth image F having the same bit depth as image A by decreasing the bit depth of the fifth image E by means of tone mapping;

a difference generating step that computes a difference between image information at each pixel position in the first image A and image information at the same pixel position in the sixth image F; and an image information assigning step wherein:

when the difference at each pixel position computed by the difference generating step is smaller than or equal to a threshold, the image information assigning step assigns image information of the fifth image E to each corresponding pixel position in the third image C, and, when the difference at each pixel position computed by the difference generating step is larger than the threshold, the image information assigning step assigns image information based on image information of the fourth image D to each corresponding pixel position in the third image C.

6. The image generation method in accordance with claim 5, wherein when the difference at each pixel position computed by the difference generating step is larger than the threshold, the image information assigning step assigns the image information of the fourth image D to each corresponding pixel position in the third image C.

7. The image generation method in accordance with claim 5, wherein when the difference at each pixel position computed by the difference generating step is larger than the threshold, the image information assigning step assigns a weighted average between the image information of the fourth image D and the image information of the fifth image E to each corresponding pixel position in the third image C.

8. An image generation program by which a computer executes the image generation method in accordance with claim 5.

9. A computer-readable storage medium which stores an image generation program by which a computer executes the image generation method in accordance with claim 5.

10. An image generation method for generating image information of a third image C by using a first image A and a second image B which have the same bit depth, and also using fourth to seventh images D to G, the method comprising:

a reference image bit-depth decreasing step that generates the seventh image G having a bit depth lower than that of the first image A by decreasing the bit depth of image A by means of tone mapping;

an image bit-depth increasing step that generates the fourth image D having the same bit depth as image A by increasing the bit depth of the seventh image G by means of tone mapping;

a corresponding point estimating step that estimates presence or absence of a point in the second image B corresponding to each pixel position of the fourth image D and also estimates the position of the relevant corresponding point;

a corresponding image assigning step that assigns, to a pixel position in the fifth image E equal to each pixel position in the fourth image D for which the corresponding point estimating step estimates that there is a corresponding point, image information of the corresponding position in the second image B;

an image interpolation step that generates image information at a pixel position in the fifth image E equal to each pixel position in the fourth image D for which the corresponding point estimating step estimates that there is no corresponding point, by means of interpolation using the image information assigned by the corresponding image assigning step;

an image bit-depth decreasing step that generates the sixth image F having the same bit depth as image G by decreasing the bit depth of the fifth image E by means of tone mapping;

a difference generating step that computes a difference between image information at each pixel position in the seventh image G and image information at the same pixel position in the sixth image F;

a threshold setting step that sets a threshold;

an image information assigning step wherein:

when the difference at each pixel position computed by the difference generating step is smaller than or equal to a threshold, the image information assigning step assigns image information of the fifth image E to each corresponding pixel position in the third image C, and, when the difference at each pixel position computed by the difference generating step is larger than the threshold, the image information assigning step assigns image information based on image information of the fourth image D to each corresponding pixel position in the third image C;

a generated difference summing step that computes the sum of differences in image information at the relevant pixel positions between the third image C obtained by the image information assigning step and the first image A; and a threshold determination step that determines the threshold which produces the minimum value in the sums of the differences computed by the generated difference summing step based on a result of repetition of the image information assigning step and the generated difference summing step while changing the threshold set by the threshold setting step within a predetermined range.

11. The image generation method in accordance with claim 10, wherein when the difference at each pixel position computed by the difference generating step is larger than the threshold, the image information assigning step assigns the image information of the fourth image D to each corresponding pixel position in the third image C.

12. The image generation method in accordance with claim 10, wherein when the difference at each pixel position computed by the difference generating step is larger than the threshold, the image information assigning step assigns a weighted average between the image information of the fourth image D and the image information of the fifth image E to each corresponding pixel position in the third image C.

13. An image generation program by which a computer executes the image generation method in accordance with claim 10.

14. A computer-readable storage medium which stores an image generation program by which a computer executes the image generation method in accordance with claim 10.

15. An image generation apparatus for generating image information of a third image C by using a first image A and a second image B having a bit depth higher than that of image A, the apparatus comprising:

an image bit-depth increasing unit that generates the third image C having the same bit depth as image B by increasing the bit depth of the first image A by means of tone mapping;

a corresponding point estimating unit that estimates presence or absence of a point in the second image B corresponding to each pixel position of the third image C and also estimates the position of the relevant corresponding point; and a corresponding image assigning unit that assigns, to each pixel position in the third image C for which the corresponding point estimating unit estimates that there is a corresponding point, image information of the corresponding position in the second image B.

16. The image generation apparatus in accordance with claim 15, further comprising:

an image interpolation unit that generates image information at each pixel position in the third image C for which the corresponding point estimating unit estimates that there is no corresponding point, by means of interpolation using the image information assigned by the corresponding image assigning unit.

17. An image generation apparatus for generating image information of a third image C by using a first image A and a second image B having a bit depth higher than that of image A, the apparatus comprising:

an image bit-depth increasing unit that generates a fourth image D having the same bit depth as image B by increasing the bit depth of the first image A by means of tone mapping;

a corresponding point estimating unit that estimates presence or absence of a point in the second image B corresponding to each pixel position of the fourth image D and also estimates the position of the relevant corresponding point;

a corresponding image assigning unit that assigns, to a pixel position in a fifth image E equal to each pixel position in the fourth image D for which the corresponding point estimating unit estimates that there is a corresponding point, image information of the corresponding position in the second image B;

an image interpolation unit that generates image information at a pixel position in the fifth image E equal to each pixel position in the fourth image D for which the corresponding point estimating unit estimates that there is no corresponding point, by means of interpolation using the image information assigned by the corresponding image assigning unit;

an image bit-depth decreasing unit that generates a sixth image F having the same bit depth as image A by decreasing the bit depth of the fifth image E by means of tone mapping;

a difference generating unit that computes a difference between image information at each pixel position in the first image A and image information at the same pixel position in the sixth image F; and an image information assigning unit wherein:

when the difference at each pixel position computed by the difference generating unit is smaller than or equal to a threshold, the image information assigning unit assigns image information of the fifth image E to each corresponding pixel position in the third image C, and, when the difference at each pixel position computed by the difference generating unit is larger than the threshold, the image information assigning unit assigns image information based on image information of the fourth image D to each corresponding pixel position in the third image C.

18. The image generation apparatus in accordance with claim 17, wherein when the difference at each pixel position computed by the difference generating unit is larger than the threshold, the image information assigning unit assigns the image information of the fourth image D to each corresponding pixel position in the third image C.

19. The image generation apparatus in accordance with claim 17, wherein when the difference at each pixel position computed by the difference generating unit is larger than the threshold, the image information assigning unit assigns a weighted average between the image information of the fourth image D and the image information of the fifth image E to each corresponding pixel position in the third image C.

20. An image generation apparatus for generating image information of a third image C by using a first image A and a second image B which have the same bit depth, and also using fourth to seventh images D to G, the apparatus comprising:

a reference image bit-depth decreasing unit that generates the seventh image G having a bit depth lower than that of the first image A by decreasing the bit depth of image A by means of tone mapping;

an image bit-depth increasing unit that generates the fourth image D having the same bit depth as image A by increasing the bit depth of the seventh image G by means of tone mapping;

a corresponding point estimating unit that estimates presence or absence of a point in the second image B corresponding to each pixel position of the fourth image D and also estimates the position of the relevant corresponding point;

a corresponding image assigning unit that assigns, to a pixel position in the fifth image E equal to each pixel position in the fourth image D for which the corresponding point estimating unit estimates that there is a corresponding point, image information of the corresponding position in the second image B;

an image interpolation unit that generates image information at a pixel position in the fifth image E equal to each pixel position in the fourth image D for which the corresponding point estimating unit estimates that there is no corresponding point, by means of interpolation using the image information assigned by the corresponding image assigning unit;

an image bit-depth decreasing unit that generates the sixth image F having the same bit depth as image G by decreasing the bit depth of the fifth image E by means of tone mapping;

a difference generating unit that computes a difference between image information at each pixel position in the seventh image G and image information at the same pixel position in the sixth image F;

a threshold setting unit that sets a threshold;

an image information assigning unit wherein:

when the difference at each pixel position computed by the difference generating unit is smaller than or equal to a threshold, the image information assigning unit assigns image information of the fifth image E to each corresponding pixel position in the third image C, and, when the difference at each pixel position computed by the difference generating unit is larger than the threshold, the image information assigning unit assigns image information based on image information of the fourth image D to each corresponding pixel position in the third image C;

a generated difference summing unit that computes the sum of differences in image information at the relevant pixel positions between the third image C obtained by the image information assigning unit and the first image A; and a threshold determination unit that determines the threshold which produces the minimum value in the sums of the differences computed by the generated difference summing unit based on a result of repetition of operations of the image information assigning unit and the generated difference summing unit while changing the threshold set by the threshold setting unit within a predetermined range.

21. The image generation apparatus in accordance with claim 20, wherein when the difference at each pixel position computed by the difference generating unit is larger than the threshold, the image information assigning unit assigns the image information of the fourth image D to each corresponding pixel position in the third image C.

22. The image generation apparatus in accordance with claim 20, wherein when the difference at each pixel position computed by the difference generating unit is larger than the threshold, the image information assigning unit assigns a weighted average between the image information of the fourth image D and the image information of the fifth image E to each corresponding pixel position in the third image C.

* * * * *

UNITED STATES PATENT AND TRADEMARK OFFICE

CERTIFICATE OF CORRECTION

PATENT NO. : 8,355,596 B2
APPLICATION NO. : 12/682027
DATED : January 15, 2013
INVENTOR(S) : Hideaki Kimata et al.

It is certified that error appears in the above-identified patent and that said Letters Patent is hereby corrected as shown below:

On the title page, in item (86), the § 371(c)(1), (2), (4) Date should indicate: -- May 13, 2010 --

Signed and Sealed this
Seventh Day of May, 2013

Teresa Stanek Rea
*Acting Director of the United States Patent and Trademark Office*